United States Patent
Elliott et al.

[11] Patent Number: 6,139,093
[45] Date of Patent: Oct. 31, 2000

[54] FRONT END-TO-BODY SIDE JOINT FOR AUTOMOTIVE VEHICLE

[75] Inventors: Jeffrey Darell Elliott, Novi; Eric Layton Stratten, Plymouth; Randy Ray Frank, Dearborn; Richard Daniel Pastrick, Roseville, all of Mich.

[73] Assignee: Ford Global Technologies, Inc., Dearborn, Mich.

[21] Appl. No.: 09/329,449

[22] Filed: Jun. 10, 1999

[51] Int. Cl.[7] ................................................. B60R 27/00
[52] U.S. Cl. ..................... 296/203.02; 296/202; 296/30
[58] Field of Search .............. 296/194, 203.02, 296/203.01, 29, 30, 202, 203.03, 193, 185, 186, 187, 146.9, 146.11

[56] References Cited

U.S. PATENT DOCUMENTS

| | | |
|---|---|---|
| 3,596,978 | 8/1971 | Wessells, III et al. . |
| 4,078,840 | 3/1978 | Itoh . |
| 4,955,662 | 9/1990 | Kudo . |
| 5,052,742 | 10/1991 | Akoshima et al. ..................... 296/192 |
| 5,478,116 | 12/1995 | Jarocki et al. . |
| 5,785,378 | 7/1998 | Seefried et al. ........................ 296/187 |

Primary Examiner—D. Glenn Dayoan
Assistant Examiner—Patricia Engle
Attorney, Agent, or Firm—David B. Kelley

[57] ABSTRACT

A body side joint structure for an automotive vehicle has a support member extending longitudinally rearward from a front end member with a distal end secured in overlapping relationship laterally inward of a hinge pillar of an adjacent body side member. A hinge reinforcement member is attached on a laterally inner surface of the distal end of the support member and door hinge brackets are attached on an outer surface of the hinge pillar which together provide a clamping load to the joint layering of the body side and front end, thus resulting in an improved lateral load path.

14 Claims, 3 Drawing Sheets

FRONT END-TO-BODY SIDE JOINT FOR AUTOMOTIVE VEHICLE

FIELD OF THE INVENTION

The present invention relates to automotive vehicle body structures in general, and more specifically to an improved front end-to-body side joint.

BACKGROUND OF THE INVENTION

It is well known in automotive vehicle body construction to provide a front end and a body on a vehicle frame. The front end typically has a longitudinally extending member, or shotgun, for attaching to a forward corner, or pillar section of the body. This front end-to-body joint typically includes a hinge reinforcement member on an interior side of the body to provide reinforcement for the door hinges, which are typically at, or near, the joint.

In past construction, the shotgun has been positioned laterally outward of the body side longitudinally forward of the door hinges, which may leave a discontinuity therebetween. Such a construction typically requires an expensive, complicated front edge to be stamped on the body side member.

Some body-on-frame constructions, such as that shown in U.S. Pat. No. 4,078,840 (Itoh), employ a panel 18 located adjacent the engine and a suspension member 20 supporting a strut type suspension unit, and tied into the dash panel 12. This construction requires a stay member 24 to provide adequate support between the pillar 14 and the front end.

In other front end constructions, such as in a unibody vehicle, front end support is achieved by tying the dash panel and/or cowl member into the strut towers, as shown in U.S. Pat. No. 3,596,978 (Wessells) and U.S. Pat. No. 4,955,662 (Kudo). Such construction is not feasible or desirable in a conventional body-on-frame vehicle.

There is thus needed a front end-to-body joint construction which provides effective transfer of loads into the vehicle body under lateral loading conditions and yet which does not increase manufacturing costs or complexity.

SUMMARY OF THE INVENTION

The present invention overcomes the disadvantages of the related art by providing a front end-to-body joint construction providing a new joint layering which improves the overall joint stiffness, which decreases door drop-off, which improves sag performance, and which simplifies the body side stamping while not increasing the vehicle weight. The joint construction of the present invention has a front end with a longitudinally rearward extending support member, or shotgun, layered between a forward end of the body side and a hinge reinforcement member, effectively clamp loading the front end to the body side through the door hinge to hinge reinforcement attachment.

The present invention thus provides a body side joint structure for an automotive vehicle having a body side member with a generally vertically extending hinge pillar at a forward end adjacent a front end member. The body joint structure has means defining a support extending longitudinally rearwardly from the front end member with a distal end secured in overlapping relationship to the hinge pillar laterally inward thereof, and at least one hinge reinforcement member attached on a laterally inner surface of the distal end of the support. A pair of door hinge brackets are mounted on an outer surface of the hinge pillar portion of the body side member in lateral alignment with the a hinge reinforcement member. The door hinge brackets work in combination with the reinforcement member to provide a clamping force on the front end-to-body side overlap. The joint structure thus provides an efficient path for transferring lateral loads from the front end member to the body structure of the vehicle.

BRIEF DESCRIPTION OF THE DRAWINGS

These and other objects, advantages, and features of the present invention will be apparent to those skilled in the art upon reading the following description with reference to the accompanying drawings, in which.

Detailed Description Of The Preferred Embodiment

Figure 1:
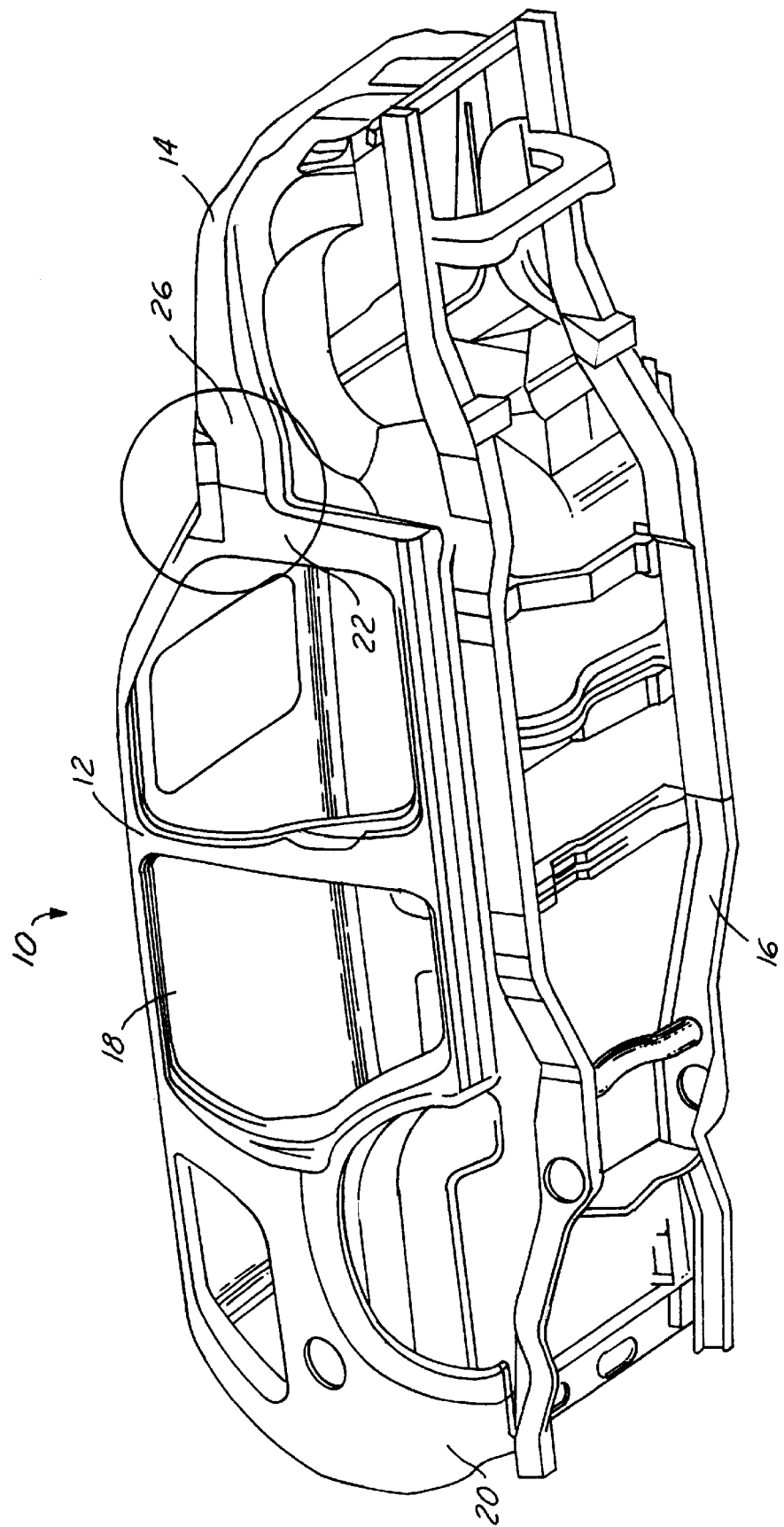
FIG. 1 is a perspective view of a vehicle body-on-frame construction utilizing the front end-to-body side joint of the present invention.

Turning now to the drawings, and in particular to FIG. 1 thereof, an automotive vehicle 10 has a body 12 and a front end 14 mountable to a frame 16 in conventional fashion known to those skilled in the art. The body 12 typically has a roof 18 supported by a pair of laterally opposed body side members 20 (only one shown) defining a passenger compartment therein. At a forward end of the body side member 20 is a generally vertically extending hinge pillar 22 which is a lower extension of the A pillar 24. The hinge pillar 22 typically serves as an attachment point for a door (not shown) in addition to providing body structural support. The front end 14 has a longitudinally extending support member 26 on an upper, laterally outward side. The present invention provides an improved front end-to-body joint in the encircled area, designated by reference number 2, of FIG. 1.

Figure 2:
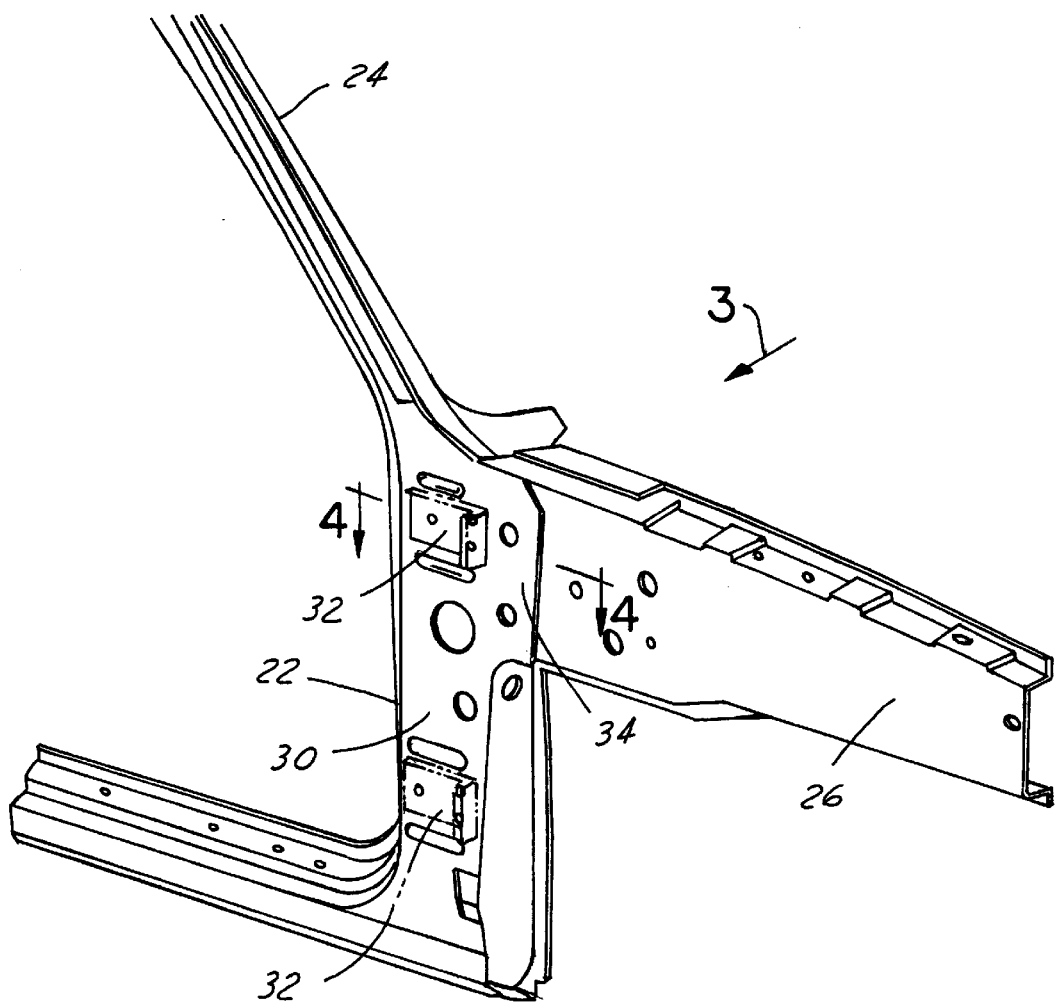
FIG. 2 is a perspective exterior view of a side joint construction according to the present invention of the encircled area of FIG. 1.
Figure 4:
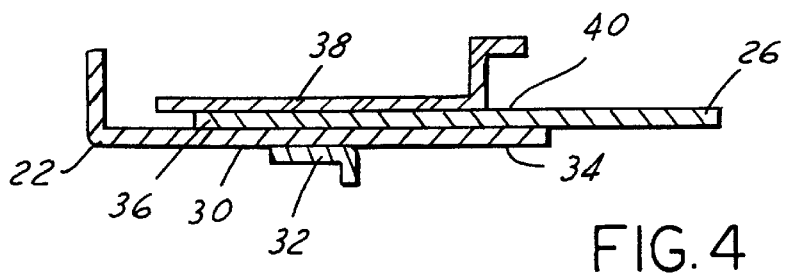
FIG. 4 is a cross-sectional view taken along line 4—4 of FIG. 2.
Figure 3:
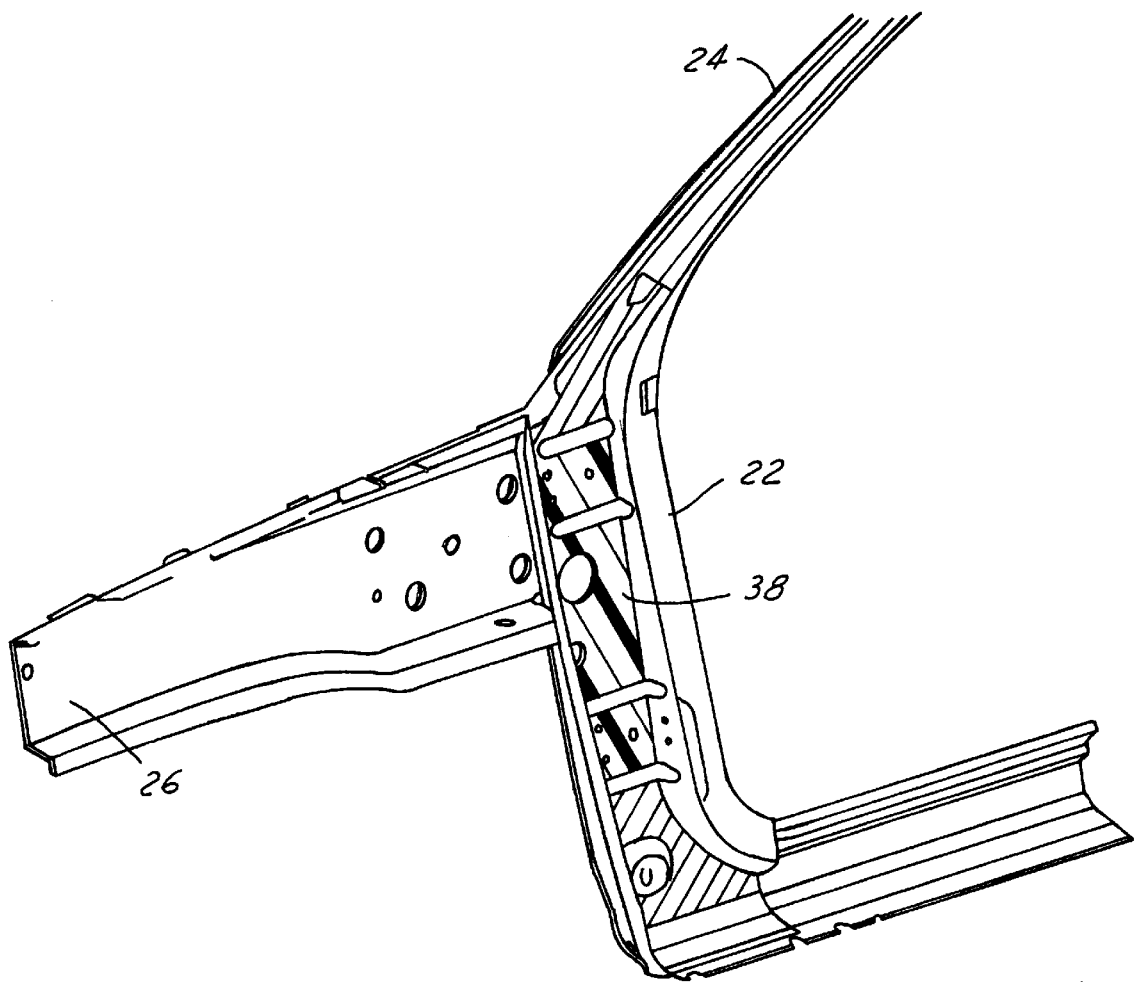
FIG. 3 is a perspective interior view of a side joint construction according to the present invention in the direction of arrow 3 in FIG. 2.

FIGS. 2–4 show in more detail the improved side joint structure of the present invention. As seen in FIG. 2, the hinge pillar 22 has an outer surface 30 on which are mounted a pair of vertically spaced hinge brackets 32 for receiving a door hinge in a known manner. The hinge pillar 22 is stamped with a flange portion 34 extending longitudinally forward in overlapping relationship with the support member 26 of the front end 14. A distal end 36 of the support member 26 is secured in overlapping relationship to the hinge pillar 22 laterally inward thereof, as best seen in FIG. 4. This attachment may be accomplished by welding, fasteners, or other attachment methods known to those skilled in the art and suggested by this disclosure.

The body side joint of the present invention takes advantage of the clamp loading provided by the door hinge through layering of the support member 26 and hinge pillar 22, as described above, between the hinge brackets 32 and a hinge reinforcement member 38 attached on a laterally inner surface 40 of the distal end 36 of the support member 26 (FIGS. 3 and 4). The door hinge brackets 32 are preferably mounted to the hinge reinforcement member 38 with metal fasteners, for example threaded metal fasteners as are known. However, other fasteners or fastening methods may be used to secure the hinge brackets 32 to the hinge reinforcement member. It should be understood that while a single hinge reinforcement member is shown (FIG. 3), a pair of vertically spaced hinged reinforcement members laterally aligned with the door hinge brackets will also suffice for the present invention.

Body side 20, front end 14, door hinge brackets 32, and hinge reinforcement member 38 are preferably made of stamped steel, but can be made of other materials, such as sheet molded composite (SMC) and the like.

The body side joint structure of the present invention, as described above, redirects lateral loads from the body/chassis mount to the shotgun, through the vehicle bulkhead, and into the cowl-structure of the vehicle. Overall joint stiffness is improved while the body side stamping is simplified without changing vehicle weight. The unique layering of the body side joint structure of the present invention takes advantage of clamp loading provided by the door hinge brackets to the hinge reinforcement member to improve load path continuity through the joint, thus resulting in better durability and overall vehicle performance.

Although the preferred embodiment of the present invention has been disclosed, various changes and modifications may be made without departing from the scope of the invention as set forth in the appended claims.

What is claimed is:

1. An improved body structure for an automotive vehicle, comprising:

a body side member having a generally vertically extending hinge pillar portion at a forward end thereof;

a front end member having a longitudinally extending support member on an upper, laterally outward side thereof, the support member having a reinforcement portion in longitudinal overlapping relationship with the hinge pillar portion and positioned laterally inward thereof;

at least one hinge reinforcement member attached on a laterally inner surface of the support member; and at least one door hinge bracket mounted on an outer surface of the hinge pillar portion in lateral alignment with the at least one hinge reinforcement.

2. A body structure according to claim 1 wherein the body side member is attached with metal fasteners to the front end member.

3. A body structure according to claim 1 wherein the body side member is welded to the front end member.

4. A body structure according to claim 1 wherein the body side member is made of sheet metal.

5. A body structure according to claim 1 wherein the front end member is made of sheet metal.

6. An improved front end-to-body side joint for an automotive vehicle for transferring load from the front end member to a body structure of the vehicle, the side joint comprising:

a body side member having a generally vertically extending hinge pillar portion at a forward end thereof;

a front-end member having a longitudinally extending support member on an upper, laterally outward side thereof, the support member having a reinforcement portion in longitudinal overlapping relationship with the hinge pillar portion and positioned laterally inward thereof;

a pair of vertically spaced reinforcement members attached on a laterally inner surface of the support member; and a pair of door hinge brackets mounted on an outer surface of the door bracket portion of the body side member in lateral alignment with the pair of spaced reinforcement members.

7. A body structure according to claim 6 wherein the body side member is attached with metal fasteners to the front end member.

8. A body structure according to claim 6 wherein the body side member is welded to the front end member.

9. A body structure according to claim 6 wherein the body side member is made of sheet metal.

10. A body structure according to claim 6 wherein the front end member is made of sheet metal.

11. A body side joint structure for an automotive vehicle having a body side member with a generally vertically extending hinge pillar at a forward end adjacent a front end member, the body joint structure comprising:

means defining a support extending longitudinally rearwardly from the front end member with a distal end secured in overlapping relationship to the hinge pillar laterally inward thereof; and at least one hinge reinforcement member attached on a laterally inner surface of the distal end of the support.

12. The body side joint structure of claim 11 including a pair of door hinge brackets mounted on an outer surface of the hinge pillar portion of the body side member in lateral alignment with the at least one reinforcement member.

13. The body side joint structure according to claim 11 wherein the door hinge brackets are mounted to the at least one reinforcement member with metal fasteners.

14. The body side joint structure according to claim 11 wherein the metal fasteners are threaded fasteners.

* * * * *